United States Patent Office 2,810,722
Patented Oct. 22, 1957

2,810,722

UTILIZATION OF BY-PRODUCTS FROM MANUFACTURE OF 2,5-DIMETHYLPIPERAZINE

Joseph J. Scigliano and David B. Kellom, Midland, Mich., assignors to The Dow Chemical Company, Midland, Mich., a corporation of Delaware No Drawing. Application January 11, 1955, Serial No. 481,264

20 Claims. (Cl. 260—268)

This invention concerns the manufacture of 2,5-dimethylpiperazine. It pertains especially to the utilization of higher boiling by-product materials, such as are normally obtained in the production of 2,5-dimethylpiperazine from isopropanolamine, to form one or both of the compounds 2,5-dimethylpiperazine and 2,5-dimethylpyrazine.

It was known, prior to this invention, that 2,5- dimethylpiperazine can be formed by heating isopropanolamine together with substances of the kinds ordinarily employed as hydrogenation catalysts and that the reaction may advantageously be carried out in contact with an atmosphere of hydrogen. Although the formation of 2,5-dimethylpiperazine from isopropanolamine can be represented by the equation:

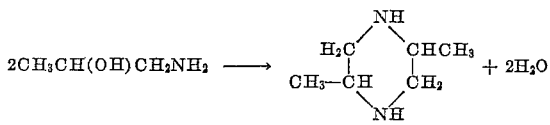

there is evidence that this is merely a summarizing equation and that a combination of dehydrogenation, condensation, and hydrogenation reactions is actually involved. For instance, the reaction, when carried out at atmospheric pressure, is usually accompanied by an evolution of hydrogen with a resultant decrease in yield of the product, but by carrying the reaction out in a closed bomb relatively little free hydrogen is formed and the yield is improved. A further improvement in yield results from carrying the reaction out in contact with added hydrogen under pressure, even though the added hydrogen is not consumed in the reaction. It is probably because the process involves the above-mentioned combination of reactions that hydrogenation catalysts are effective.

The known process usually results in formation of a mixture of cis- and trans-2,5-dimethylpiperazines together with other products, including a considerable amount of liquid to tarry by-products that are higher boiling than the 2,5-dimethylpiperazines. The high boiling by-product material is a mixture of a number of compounds, not readily separable by distillation, and the individual ingredients thereof have not been isolated or identified. The 2,5-dimethylpiperazines have heretofore been separated by distillation from the higher boiling by-products and the latter discarded. Trans-2,5-dimethylpiperazine, when formed in sufficient amount, can be separated by crystallization from the cis-isomer which, contrary to teachings in the art, is a liquid at room temperature, The relative yields of the cis- and trans-dimethylpiperazines and of other products, especially the high boiling by-products, vary with changes in the conditions under which the reaction is carried out. The high boiling by-products, with which this invention is particularly concerned, have usually been obtained in amounts such as to account for from 10 to 20 percent or more of the isopropanolamine consumed in the reaction.

In the course of the present study, it was observed that the proportion of high boiling by-products present in the crude reacted mixtures decreased somewhat with increase in the time of reaction under otherwise similar reaction conditions. For instance, in two experiments in which the same relative proportions of isopropanolamine and a hydrogenation catalyst were heated together with hydrogen in a closed vessel at 145° C. for 4 hours and 10 hours, respectively, it was observed that the high boiling by-product material was formed in amount corresponding to 10.8 percent of the weight of the consumed isopropanolamine when the reaction time was 4 hours, and in amount corresponding to 9.1 percent of the weight of the consumed isopropanolamine when the reaction time was 10 hours. From these results, it is evident that the high boiling by-products are formed during the reaction to make the 2,5-dimethylpiperazine from isopropanolamine and that, on continued heating of the reaction mixture, they are slowly converted, at least in part, into one or more lower boiling materials. It is also evident that an excessively long period of heating of the reaction mixture would be required in order to reduce greatly the amount of high boiling by-product material from the reactioin. However, the results of these experiments show that part of the high boiling by-products can be chemically converted into lower boiling material and they indicate a possibility of converting at least part of the high boiling by-product material into a further amount of 2,5-dimethylpiperazine.

It has been found that the high boiling by-product material from the catalytic reaction of isopropanolamine to form 2,5-dimethylpiperazine can be reacted to form one or both of the compounds 2,5-dimethylpiperazine and 2,5-dimethylpyrazine by heating a mixture of the recovered high boiling by-products and a hydrogenation catalyst at a reaction temperature, e. g. of from 130° to 300° C. The reaction for conversion of such by-products to one or both of the lower boiling compounds, 2,5-dimethylpiperazine and 2,5-dimethylpyrazine, occurs more readily and completely after removal of the by-products from the catalyst-containing mixture in which they are formed than when the crude mixture in which they are formed is heated at a similar temperature.

It has further been found that the relative yields of 2,5-dimethylpiperazine and 2,5-dimethylpyrazine from such conversion of the higher boiling by-product material are dependent in part on the kind of hydrogenation catalyst employed and in part upon whether the reaction is carried out in contact with hydrogen at superatmospheric pressure. Any of the catalysts for the hydrogenation of organic compounds such as ethylene, propylene, benzene, toluene, or phenol, etc., can apparently be used to effect the conversion. However, many such catalysts, e. g. copper chromite, copper powder, the less active forms of nickel catalysts, and mixtures of two or more of such catalysts, etc., cause formation of 2,5-dimethylpyrazine in considerable amount, even when the reaction is carried out in a closed vessel containing hydrogen under a pressure of from 200 to 300 pounds per square inch. Hydrogen tends to be formed during the catalytic reaction for the conversion of the by-product material and, when the hydrogen is permitted to escape freely, e. g. by carrying the reaction out in an open vessel at atmospheric pressure, 2,5-dimethylpyrazine is usually obtained as the principal product, regardless of the kind of hydrogenation catalyst employed. The 2,5-dimethylpyrazine formed in either of these ways can be separated, e. g. by distillation, and be obtained as a product. If desired, it can be hydrogenated in known manner to form 2,5-dimethylpiperazine, usually a mixture of cis- and trans-2,5-dimethylpiperazines. This hydrogenation of the purified 2,5-dimethylpyrazine can be accomplished with catalysts which are not effective in hydrogenating the crude 2,5-dimethylpyrazine in the mixture in which it is formed.

It has further been found that the more active of the nickel-containing hydrogenation catalysts, particularly Raney nickel and the finely divided nickel formed by reduction of precipitated nickel hydrate, e. g. $Ni(OH)_2$, are effective in causing direct conversion of a substantial portion of the above-mentioned high boiling by-product materials into 2,5-dimethylpiperazine, usually a mixture of cis- and trans-2,5-dimethylpiperazines, when the reaction is carried out under conditions which prevent free escape of hydrogen from the reacted mixture. These more active nickel catalysts are effective for the purpose, i. e. formation of 2,5-dimethylpiperazines, regardless of whether they be used individually or in admixture with one another or with other kinds of hydrogenation catalysts such as those hereinbefore mentioned. Escape of hydrogen from the reaction mixture can be prevented by carrying out the reaction in a closed vessel, e. g. a bomb or autoclave. This results in formation of a small amount of hydrogen which pressurizes the vessel and prevents further liberation of hydrogen from the reacting materials. The vessel containing the reaction mixture is preferably charged initially with hydrogen so as to prevent, as nearly as possible, occurence of the dehydrogenation reaction. When using the above-mentioned active nickel catalysts only a moderate hydrogen pressure, e. g. of 50 pounds per square inch, gauge, is usually sufficient to prevent the dehydrogenation from occurring to more than a minor extent. Occurrence of the dehydrogenation results in formation of 2,5-dimethylpyrazine as a product. Often some 2,5-dimethylpyrazine is formed together with the 2,5-dimethylpiperazines. These two kinds of products can be separated in usual ways, e. g. by an acid-extraction operation.

Hydrogenation catalysts such as those hereinbefore mentioned are known. However, since nickel catalysts of varying activities are known, a brief description as to the preparation of the reduced nickel hydrate catalyst may be desired. It is formed by adding sodium hydroxide, or other alkali, to an aqueous solution of a nickel salt, preferably nickel nitrate, to precipitate nickel hydroxide, i. e. nickel hydrate. Usually the nickel hydrate is caused to precipitate on a carrier material such as aluminum oxide, pumice, diatomaceous earth, or charcoal, etc., so as to form a supported catalyst, but this is not required. The nickel hydrate, as such or deposited on a carrier material, is reduced with hydrogen to form the finely divided nickel catalyst.

It has still further been found that by admixing the by-product material with isopropanolamine and heating the mixture together with a hydrogenation catalyst to a reaction temperature under conditions suitable for formation of the 2,5-dimethylpiperazines and/or 2,5-dimethylpyrazine, less of the by-product material is formed than when the isopropanolamine alone is heated together with the catalyst under otherwise similar conditions and the combined yield of 2,5-dimethylpiperazines and 2,5-dimethylpyrazine from the reaction is increased to a corresponding extent. This advantage is obtained regardless of the kind of hydrogenation catalyst employed and regardless of whether the reaction is carried out at atmospheric pressure or in a closed vessel to prevent evolution of hydrogen from the mixture. However, by initially adding the by-product material to the isopropanolamine and heating the latter together with Raney nickel and/or a reduced nickel hydrate catalyst in a closed vessel, the yield of 2,5-dimethylpiperazine can be increased over that obtainable from the isopropanolamine alone under otherwise similar reaction conditions. When thus operating, the vessel containing the starting materials is preferably, but not necessarily, initially charged with gaseous hydrogen.

The reaction can be accomplished by heating a mixture of the high boiling by-product material and a hydrogenation catalyst to temperatures in the order of from 130° to 300° C., preferably from 175° to 225° C., at atmospheric or superatmospheric pressure. The catalyst is usually employed in amount corresponding to from 5 to 15 percent of the combined weight of the same and the material to be reacted, e. g. the by-product material, but it can be used in smaller or larger proportions. The mixture is preferably agitated during the reaction so as to distribute the catalyst throughout the same. Raney nickel or reduced nickel hydrate is preferably used as a catalyst and the reaction is advantageously carried out in a closed vessel at the autogenous pressure or above, since these conditions prevent free evolution of hydrogen from the mixture and result in an increase in yield of the 2,5-dimethylpiperazines. The reaction is preferably carried out in a closed vessel in contact with an initially added atmosphere of hydrogen, since this results in a further improvement in yield of the 2,5-dimethylpiperazines.

A preferred mode of practicing the invention involves adding the recovered high boiling by-product material to a fresh quantity of isopropanolamine and heating the resulting mixture together with a hydrogenation catalyst, preferably Raney nickel or reduced nickel hydrate, under the above-described reaction conditions. This results in conversion of the isopropanolamine to 2,5-dimethylpiperazine in higher yield and with formation of a smaller amount of the high boiling by-product material than is obtained when the isopropanolamine and catalyst are heated, without initial addition of the high boiling by-products, under otherwise similar reaction conditions.

The high boiling by-product material is effective in restricting further formation of the same, regardless of the proportion thereof initially added to the isopropanolamine, and it can be added with advantage in any desired proportion. It is usually added in amount as great as, or greater than, that which is formed, without its addition, by reacting the isopropanolamine alone under otherwise similar conditions. By adding a sufficiently large amount of the high boiling by-product material to the isopropanolamine and carrying out the reaction, it has been possible in some instances to obtain a net consumption of the high boiling by-products, i. e. to obtain a reacted mixture containing a smaller proportion by weight of the high boiling by-product material than was present in the starting material.

The invention may be practiced in a continuous manner by passing isopropanolamine, preferably under pressure, through a chamber containing the catalyst where it is heated at the reaction temperature, advantageously in contact with an atmosphere of hydrogen, distilling the effluent reaction mixture to separate the 2,5-dimethylpiperazines and/or 2,5-dimethylpyrazine from the higher boiling by-products, and returning part, or all, of the latter into admixture with the isopropanolamine feed material. This practice results in a decrease in yield of the high boiling by-product material from the reaction and an increase in the combined yield of the lower boiling compounds, 2,5-dimethylpiperazines and 2,5-dimethylpyrazine. However, a portion, e. g. one-fourth or thereabout, of the high boiling by-product material is apparently not converted readily into said lower boiling compounds and, unless withdrawn, tends to accumulate in the reaction system. For this reason, part, e. g. from one-fourth to half, of the high boiling by-product material is advantageously withdrawn from the system. It may be heated directly, together with an added hydrogenation catalyst, under the reaction conditions hereinbefore described to convert part of the same into either or both of said lower boiling compounds which may be separated from the remaining high boiling material by distillation.

Any of the reactions hereinbefore described can, if desired, be carried out in the presence of inert liquids, e. g. cyclohexane, or liquid paraffinic hydrocarbons such as ligroin, etc., as diluents or solvents for the reactants. However, the employment of a liquid diluent has not proven to be advantageous and has frequently resulted in a reduction in reaction rate. Accordingly, the reactions are usually carried out in the substantial absence of solvents or diluents, although the presence of inert liquids, especially in minor amounts, can be tolerated.

The following examples describe ways in which the invention has been practiced and illustrate certain of its advantages, but are not to be construed as limiting the invention.

EXAMPLE 1

A fraction, boiling at from 180° to 200° C. at atmospheric pressure, of the residue remaining after distilling 2,5-dimethylpiperazines from a mixture obtained by heating isopropanolamine together with a hydrogenation catalyst at a reaction temperature in a closed vessel, was employed as a starting material in this experiment. A bomb was partially filled with a mixture of 100.5 grams of said fraction and 15 grams of Raney nickel. Air was swept from the free space in the vessel wtih hydrogen at atmospheric pressure and the bomb was closed. The bomb was rocked and heated at 200° C. for 3 hours, during which time the maximum vapor pressure developed by the mixture inside the bomb was approximately 175 pounds per square inch, gauge. The bomb was then cooled, opened, and the charge removed. The reaction mixture was diluted with acetone, filtered to remove the catalyst, and fractionally distilled. There were obtained about 26 grams of 2,5-dimethylpyrazine and 55 grams of cis- and trans-2,5-dimethylpiperazines in a ratio of approximately 3.3 parts by weight of the cis-isomer per part of the trans-isomer. As the still residue, there was obtained 18.4 grams of material boiling above 180° C. at atmospheric pressure. Approximately 67 percent by weight of the high boiling starting material that was consumed in the reaction was converted to the 2,5-dimethylpiperazines.

Another experiment was carried out using, as starting materials, 116.5 grams of said fraction, i. e. the by-product material boiling at from 180° to 200° C. and 15 grams of Raney nickel. After loading the bomb with this mixture, hydrogen under a pressure of 650 pounds per square inch, gauge, was charged into the bomb at room temperature and the bomb was closed. Otherwise the procedure in carrying out the reaction and separating the products from the remaining by-product material was similar to that described above. There were obtained about 35 grams of 2,5-dimethylpyrazine and approximately 62.2 grams of cis- and trans-2,5-dimethylpiperazines in a ratio of 3.4 parts by weight of the cis-isomer per part of the trans-isomer. The residue remaining after the distillation weighed 17.8 grams. Approximately 63 percent of the by-product starting material which was consumed in the reaction was converted to the 2,3-dimethyl piperazines.

Another experiment was carried out in a similar manner except that the organic starting material consisted of 111 grams of the by-products boiling above 200° C. at atmospheric pressure. There was obtained approximately 19.3 grams of a mixture of cis- and trans-2,5-dimethylpiperazines in a ratio of 2.76 parts of the cis-isomer per part of the trans-isomer. The residue from the distillation of the 2,5-dimethylpiperazines from the reaction products weighed 91.5 grams. Approximately 99 percent by weight of the starting material consumed in the reaction was converted to the 2,5-dimethylpiperazines.

It is evident from the last two of the above experiments that the portion of the by-product material boiling at from 180° to 200° C. is more rapidly reactive than higher boiling by-product material in forming 2,5-dimethylpiperazines, but that the yield of 2,5-dimethylpiperazines, based on the consumed by-products, was higher when employing the by-products boiling above 200° C. than when employing by-products boiling at from 180° to 200° C. at atmospheric pressure.

EXAMPLE 2

This example illustrates the effectiveness of the initially added high boiling by-products in suppressing further formation of the same during a reaction for the formation of 2,5-dimethylpiperazines from isopropanolamine. In an experiment carried out without such addition, a mixture of 123 grams of isopropanolamine and 15 grams of Raney nickel was placed in a bomb and hydrogen under a pressure of 340 pounds per square inch was fed into the bomb at rom temperature. The bomb was closed and heated, while rocking the same, at 200° C. for 3 hours. The bomb was then cooled, opened, and the charge removed. The bomb was washed free of adhering material with acetone and the washings were added to the mixture. The latter was filtered to remove the catalyst and fractionally distilled. There were obtained 5 grams of unconsumed isopropanolamine and 75.2 grams of a mixture of cis- and trans-2,5-dimethylpiperazines. The yield of the 2,5-dimethylpiperazines was 84 percent of theoretical, based on the amount of isopropanolamine consumed in the reaction. The high boiling residue from the distillation weighed 14 grams In another experiment, a bomb was charged with a mixture of 117.1 grams of isopropanolamine, 20.9 grams of the high boiling by-products from the reaction of isopropanolamine to form 2,5-dimethylpiperazine, and 15 grams of Raney nickel. Hydrogen under a pressure of 330 pounds per square inch, gauge, was fed into the bomb at room temperature. The bomb was closed and heated, while rocking the same, at 200° C. for 3 hours. It was then cooled, opened, and the charge removed, the bomb being washed free of residual material with acetone and the washings added to the reaction mixture. The latter was fractionally distilled. There were obtained 1.2 grams of unconsumed isopropanolamine and 83.3 grams of the 2,5-dimethylpiperazines. The yield of the 2,5-dimethylpiperazines was 94.7 percent of theoretical, based on the amount of isopropanolamine consumed in the reaction. The high boiling by-products obtained as a still residue weighed 26.8 grams. Since 20.9 grams of such by-product material was present in the starting mixture, only 5.9 grams of the same was formed in the reaction.

EXAMPLE 3

In each of two experiments, 20 grams of a supported nickel catalyst and the weight of isopropanolamine indicated in the following table were placed in a bomb. The catalyst was prepared by immersing granular aluminum oxide in an aqueous nickel nitrate solution, adding aqueous sodium hydroxide with stirring to cause formation and precipitation of nickel hydrate, i. e. nickel hydroxide, on the aluminum oxide, filtering the mixture and washing the granular material with water, drying the granular material, and heating the latter at from 400° to 425° C. while passing hydrogen over the same at approximately atmospheric pressure, to reduce the nickel hydrate on the granules to metallic nickel. The catalyst thus prepared contained approximately 35 percent by weight of nickel. In one of the experiments, 20.8 grams of by-product material, boiling above 180° C. at atmospheric pressure and obtained in prior preparations of 2,5-dimethylpiperazine, was also added, but the other experiment was carried out without addition of such by-product material. Each bomb was then charged at room temperature with hydrogen at 350 pounds per square inch gauge pressure and closed. Each bomb was rocked and heated to 200° C. for 3 hours. Each bomb was then cooled, hydrogen was vented therefrom, and the charge was removed. Final portions of the mixture were washed from the bomb with acetone. The mixture was filtered to remove the catalyst and the filtrate was fractionally distilled to remove the ingredients boiling at temperatures up to 180° C. at atmospheric pressure. The still residue was weighed and the distillate fractions were weighed and analyzed. Table I gives the weight of isopropanolamine employed in each experiment and indicates whether the by-product material was added to the starting mixture. It gives the weight of by-product material obtained as a still residue in each experiment and the weight of such by-product material formed in the reaction. It also gives the weight of unreacted isopropanolamine recovered in each experiment and approximately the percent yield of each of the compounds 2,5-dimethylpyrazine, cis-2,5-dimethylpiperazine and trans-2,5-dimethylpiperazine, based on the amount of isopropanolamine consumed. In the table isopropanolamine is abbreviated as "IPA," 2,5-dimethylpyrazine is abbreviated as "DMPY," 2,5-dimethylpiperazine is abbreviated as "DMPP," and the by-product material is referred to as "residue."

described in Example 3. Table II gives the amount of isopropanolamine in each starting mixture and indicates whether the by-product material, which is termed "residue," was initially added. The table gives the weight of by-products, boiling above 180° C. which was obtained as a residue after distilling the lower boiling products from each of the reacted mixtures. The table gives the weight of unreacted isopropanolamine that was recovered in each experiment and it expresses the amount of the by-product material, boiling above 180° C. at atmospheric pressure, which was formed in the reaction as percent of the weight of the isopropanolamine consumed. The table also gives the percent yield, based on the consumed isopropanolamine, of each of the compounds 2,5-dimethylpiperazine, cis-2,5-dimethylpiperazine and trans-2,5-dimethlypiperazine and the combined yield of these several valuable products. The abbreviations employed in Table II are similar to those used in Table I.

Table II

| Run No. | Starting Conditions | | | Results | | | | | | |
|---|---|---|---|---|---|---|---|---|---|---|
| | IPA, gms. | Residue Added, gms. | H₂ Press., lbs./sq. in. | Uncon-sumed IPA, gms. | Residue in re-acted mix., gms. | Residue formed, percent of cons. IPA | Percent Yields | | | |
| | | | | | | | DMPY | DMPP | | Total |
| | | | | | | | | cis | trans | |
| 1 | 123.0 | 0 | 325 | 29.5 | 14.45 | 15.5 | 18.5 | 34.0 | 27.8 | 80.3 |
| 2 | 110.7 | 14.8 | 350 | 51.0 | 18.7 | 6.5 | 35.0 | 56.5 mostly cis- | | 91.5 |

Table I

| Run No. | Reactants | | Products | | | | | | |
|---|---|---|---|---|---|---|---|---|---|
| | IPA, gms. | Residue, gms. | Residue in reacted mixture, gms. | Residue formed in reaction, gms. | IPA recov'd, gms. | Percent yields of— | | | |
| | | | | | | DMPY | DMPP | | |
| | | | | | | | cis- | trans- | |
| 1 | 121 | 0 | 20.6 | 20.6 | 18.2 | 12.7 | 52.5 | 17.5 | |
| 2 | 122 | 20.8 | 21.1 | 0.3 | 15.9 | 19.2 | 60.9 | 19.7 | |

EXAMPLE 4

In each of two experiments, 15 grams of copper powder and the weight of isopropanolamine given in Table II were placed in a bomb. In one of the experiments, 14.8 grams of the aforementioned by-product material, boiling at above 180° C. at atmospheric pressure, was also added as starting material. Each loaded bomb was charged at room temperature with hydrogen at the pressure given in the table and closed. Each bomb was rocked and heated at 200° C. for 3 hours, then cooled, vented of hydrogen and opened. Except for the details just given, the procedure in carrying out each experiment and in determining the products formed was similar to that described in Example 3.

EXAMPLE 5

Two experiments were carried out in ways similar to those described in Example 4, except that 15 grams of a supported nickel catalyst which had been formed by depositing nickel nitrate on granular aluminum oxide, thermally decomposing the nickel nitrate, and reducing the resulting nickel oxide with hydrogen, was used in each of the starting mixtures. This catalyst contained about 60 percent by weight of nickel. One of the starting mixtures consisted of said catalyst together with the weight of isopropanolamine given in Table III. The other starting mixture consisted of said catalyst together with the weights of isopropanolamine and of the aforementioned by-product material given in the table. The bomb containing each starting mixture was initially charged at room temperature with hydrogen at the pressure given in the table and closed. The results of the respective experiments given in Table III are expressed in terms similar to those employed in Table II.

Table III

| Run No. | Starting Conditions | | | Results | | | | | | |
|---|---|---|---|---|---|---|---|---|---|---|
| | IPA, gms. | Residue Added, gms. | H₂ Press., lbs./sq. in. | Uncon-sumed IPA, gms. | Residue in re-acted mix., gms. | Residue formed, percent of cons. IPA | Percent Yields | | | |
| | | | | | | | DMPY | DMPP | | Total |
| | | | | | | | | cis | trans | |
| 1 | 117.0 | 0 | 340 | 21.0 | 19.3 | 20.5 | nil | 53.8 | 19.7 | 73.5 |
| 2 | 80.9 | 16.1 | 350 | 14.4 | 28.2 | 18.2 | 15.1 | 39.5 | 19.7 | 74.3 |

The 2,5-dimethylpyrazine and 2,5-dimethylpiperazine products indicated in run 2 of the table were collected as a mixture of the same. A portion of the mixture was analyzed to determine its composition. The remainder of the mixture was dissolved in glacial acetic acid, a platinum oxide catalyst was added, and the 2,5-dimethylpyrazine in the mixture was reduced by agitating the latter at room temperature in contact with hydrogen at from 40 to 45 pounds per square inch gauge pressure. The yield of the 2,5-dimethylpiperazines was thereby increased to approximtaely 74.3 percent of theoretical.

EXAMPLE 6

In each of a series of experiments, a mixture of isopropanolamine and the aforementioned high boiling by-product material, in the amounts stated in the following table, and 15 grams of Raney nickel catalyst were placed in a bomb. Hydrogen at the pressure indicated in the table was charged into the bomb at room temperature and the bomb was closed. The bomb was rocked and heated at 200° C. for 3 hours. It was then cooled, opened, and the charge removed. The bomb was washed out was acetone and the washings added to the reaction mixture. The latter was filtered to remove the catalyst and the filtrate was fractionally distilled to recover any unreacted isopropanolamine and to remove the 2,5-dimethylpiperazine products from the higher boiling by-products. The experiments differed from one another, in that the by-product material initially added in the first experiment had been stripped of ingredients boiling below 200° C. at atmospheric pressure, whereas the by-product material initially added in each of the subsequent experiments consisted of the still residue boiling above 180° C. which was obtained in the preceding experiment. Table IV gives the weight, in grams, of isopropanolamine and by-product material in the starting mixture for each experiment, the percent conversion, i. e. consumption, of the isopropanolamine, the percent yield of the 2,5-dimethylpiperazines based on the amount of isopropanolamine consumed, and the weight of higher boiling by-product material obtained as a residue from the distillation of the 2,5-dimethylpiperazines from the reacted mixture. The table also gives the weight in grams of the high boiling by-products formed in each reaction, i. e. the difference between the weight of the still residue and the weight of the by-product material fed to the reaction. The abbreviations used in the table have the meanings given in preceding examples.

*Table IV*

| Run No. | Starting Materials | | $H_2$, lbs./sq. in. | Results | | | |
|---|---|---|---|---|---|---|---|
| | IPA, gms. | Residue, gms. | | Percent Conversion | Percent Yield of DMPP | Residue Obtained, gms. | Residue Formed, gms. |
| 1 | 98.35 | 16.85 | 340 | 90 | 92.8 | 20.9 | 4.05 |
| 2 | 117.1 | 20.9 | 330 | 99 | 94.7 | 26.8 | 5.9 |
| 3 | 116.4 | 26.6 | 350 | 98 | 85.0 | 33.4 | 6.8 |
| 4 | 92.1 | 32.4 | 350 | 95 | 89.5 | 37.0 | 4.6 |

EXAMPLE 7

A number of experiments were carried out in a manner similar to that employed in the individual experiments of Example 6, except that the by-product material initially added in each experiment had been stripped of ingredients below 200° C. at atmospheric pressure and the weight ratio of the by-product material, i. e. residue, to isopropanolamine in the starting mixtures was increased from one experiment to the next. Table V gives information as to these experiments.

*Table V*

| Run No. | Starting Materials | | $H_2$, lbs./sq. in. | Results | | | |
|---|---|---|---|---|---|---|---|
| | IPA, gms. | Residue, gms. | | Percent Conversion | Percent Yield of DMPP | Residue Obtained, gms. | Residue Formed, gms. |
| 1 | 116.63 | 2.87 | 340 | 96 | 85.0 | 14.0 | 11.13 |
| 2 | 105.8 | 12.2 | 340 | 95 | 85.3 | 22.2 | 10.0 |
| 3 | 98.35 | 16.85 | 340 | 90 | 92.8 | 20.4 | 4.05 |
| 4 | 93.6 | 23.4 | 340 | 91 | 92.6 | 28.0 | 4.6 |
| 5 | 69.6 | 44.8 | 350 | 98.5 | 96.0 | 40.2 | [1] −4.6 |

[1] Grams of residue consumed.

EXAMPLE 8

In each of two experiments, 2,5-dimethylpiperazines were produced in a continuous manner from feed mixtures comprising isopropanolamine. In one of the experiments, the reactive feed material consisted only of isopropanolamine. Said experiment represents practice outside the scope of this invention and is presented for purpose of camparison with the other experiment. The second experiment, which was in accordance with the invention, employed a feed mixture consisting of 86 percent by weight of isopropanolamine and 14 percent of by-product material, boiling above 180° C. at atmospheric pressure, that had been obtained in earlier reactions for the production of 2,5-dimethylpiperazine from isopropanolamine. In each experiment, the starting material was fed to a reaction chamber, containing about 12 pounds of Raney nickel catalyst, at a rate such that the contact time, i. e. the average time required for flow of an infinitesimal portion of the reactive material through the reaction chamber, was approximately 4 hours. During flow through the reaction chamber the mixture was heated at from 205° to 210° C. in contact with hydrogen at a pressure of from 700 to 800 pounds per square inch gauge. The liquid reaction mixture flowed upward from the reaction chamber, and through a valved outlet line, at a rate permitting the catalyst to settle therefrom and be retained in the reaction chamber. From time to time, in each experiment, small portions of fresh Raney nickel catalyst were introduced into the reaction chamber as necessary to maintain a fairly rapid rate of reaction. From time to time after the start of each experiment samples of the mixture flowing from the reaction zone were withdrawn, weighed, and fractionally distilled to recover any unconsumed isopropanolamine, separate a distillate fraction rich in the 2,5-dimethylpiperazines and obtain a residue of the higher boiling by-products. The amounts of these several materials were determined. Also, the relative proportions of the cis- and trans-dimethylpiperazine products were determined. From this data, there were calculated the percent of the isopropanolamine feed material being consumed in the reaction, the percent yield of the 2,5-dimethylpiperazines based on the consumed isopropanolamine, and the ratio, by weight of cis- and trans-isomers in the 2,5-dimethylpiperazines. This data is included in the following table. The table also gives the time, in hours after starting the experiment, when each of the samples of the reaction mixture was withdrawn and the percent by weight of the high boiling by-product material in the sample. The table also gives, for each of the samples, the percent of high boiling by-product material being formed in the reaction, which value was obtained by subtracting the percent of such by-product material in the feed to the reaction from the percent of the by-product material in the sample of the reacted mixture.

Table VI

| Run | Feed Material | Sampled, Hrs. after Start of Run | Percent IPA Consumed | DMPP Percent Yield | DMPP Ratio, Cis/trans | Residue Wt. Percent in Sample | Residue Percent Formed in Reaction |
|---|---|---|---|---|---|---|---|
| 1 | IPA | 17.5 | 85 | 72 | 3/1 | 15 | 15 |
|   | IPA | 22.5 | 92 | 79 | 2/1 | 13 | 13 |
|   | IPA | 35.0 | 83 | 67 | 2.3/1 | 19 | 19 |
| Average of above values. | | | 86.7 | 72.7 | 2.65/1 | 15.7 | 15.7 |
| 2 | 86% IPA+14% Residue. | 14 | 86 | 75.6 | 2.7/1 | 22 | 8 |
|   | do | 22 | 84 | 72.2 | 3.2/1 | 24 | 10 |
|   | do | 27 | 85 | 72.2 | 3/1 | 24 | 10 |
|   | do | 29.5 | 83 | 75.6 | 3.2/1 | 22 | 8 |
| Average of above values for run 2. | | | 84.5 | 73.9 | 3/1 | 23 | 9 |

We claim:

1. In a method wherein a reaction mixture comprising a 2,5-dimethylpiperazine and a higher boiling by-product material is formed by heating isopropanolamine together with a hydrogenation catalyst at a reaction temperature and said by-product material is separated from the 2,5-dimethylpiperazine, the improvement which consists in heating this by-product material together with a hydrogenation catalyst, selected from the group consisting of finely divided copper, copper chromite and nickel-containing hydrogenation catalysts, at a reaction temperature between 130° and 300° C., whereby at least one of the compounds 2,5-dimethylpyrazine and the isomeric 2,5-dimethylpiperazines is formed.

2. A method, as claimed in claim 1, wherein the by-product material is heated together with the catalyst to the reaction temperature in a closed vessel at a pressure at least as high as the autogenous pressure.

3. A method, as claimed in claim 2, wherein the hydrogenation catalyst is one comprising metallic nickel as an active ingredient.

4. A method, as claimed in claim 3, wherein the hydrogenation catalyst comprises Raney nickel.

5. A method, as claimed in claim 1, wherein a mixture of the by-product material and the catalyst in contact with an atmosphere of added hydrogen is heated to the reaction temperature in a closed vessel and the lower boiling organic material, thereby formed, is distilled from the reaction products.

6. A method, as claimed in claim 5, wherein the hydrogenation catalyst is one comprising finely divided nickel as an active ingredient.

7. A method, as claimed in claim 5, wherein the hydrogenation catalyst comprises Raney nickel.

8. A method, as claimed in claim 5, wherein the hydrogenation catalyst comprises reduced nickel hydrate.

9. In a method wherein at least one of the isomeric 2,5-dimethylpiperazines and a higher boiling by-product material are formed by heating isopropanolamine together with a hydrogenation catalyst, selected from the class consisting of finely divided copper, copper chromite and nickel-containing hydrogenation catalysts, to a reaction temperature, the improvement which comprises adding such by-product material from prior practice of the reaction to the starting mixture and carrying out the reaction in the presence of the added by-product material.

10. In a method, as described in claim 9, the further improvement of heating the mixture of isopropanolamine, the added by-product material, and the hydrogenation catalyst to a reaction temperature between 130° and 300° C. in a closed vessel at a pressure at least as high as the autogenous pressure.

11. In a method, as described in claim 9, the further improvement of heating a mixture comprising isopropanolamine, the added by-product material and a hydrogenation catalyst comprising Raney nickel to a reaction temperature between 130° and 300° C. in a closed vessel at a pressure at least as high as the autogenous pressure.

12. In a method, as described in claim 9, the further improvement of heating a mixture comprising isopropanolamine, the added by-product material and a hydrogenation catalyst comprising reduced nickel hydrate to a reaction temperature between 130° and 300° C. in a closed vessel at a pressure at least as high as the autogenous pressure.

13. In a method, as described in claim 9, the further improvement of heating the mixture of isopropanolamine, the added by-product material and the hydrogenation catalyst in contact with added hydrogen to a reaction temperature between 130° and 300° C. in a closed vessel.

14. In a method, as described in claim 9, the further improvement of heating a mixture comprising isopropanolamine, the added by-product material, and a hydrogenation catalyst which comprises Raney nickel, in contact with added hydrogen to a reaction temperature between 130° and 300° C. in a closed vessel.

15. In a method, as described in claim 9, the further improvement of heating a mixture comprising isopropanolamine, the added by-product material, and a hydrogenation catalyst comprising reduced nickel hydrate, in contact with added hydrogen to a reaction temperature between 130° and 300° C. in a closed vessel.

16. A continuous method for the production of 2,5-dimethylpiperazines which comprises feeding isopropanolamine and the by-product material higher boiling than the 2,5-dimethylpiperazines that is formed together with the latter from isopropanolamine, to a reaction zone containing a hydrogenation catalyst, selected from the class consisting of finely divided copper, copper chromite and nickel-containing hydrogenation catalysts, heating the mixture in said zone at a reaction temperature between 130° and 300° C., removing catalyst from the reacted mixture, and distilling the resulting organic products, having boiling temperatures not higher than 180° C. at atmospheric pressure, from the effluent reaction mixture to obtain a residue of the high boiling by-product material.

17. A method, as claimed in claim 16, wherein the mixture within the reaction zone is heated to the reaction temperature in contact with gaseous hydrogen at superatmospheric pressure.

18. A method, as claimed in claim 16, wherein the catalyst is a nickel-containing hydrogenation catalyst and the mixture within the reaction zone is heated to the reaction temperature in contact with gaseous hydrogen at superatmospheric pressure.

19. A method, as claimed in claim 16, wherein the catalyst is one comprising Raney nickel, the mixture within the reaction zone is heated to the reaction temperature in contact with gaseous hydrogen at superatmospheric pressure, 2,5-dimethylpiperazines are distilled from the effluent reaction mixture, and at least a portion of the residue from the distillation of the 2,5-dimethylpiperazines is recycled to the reaction zone.

20. A method, as claimed in claim 16, wherein the catalyst is one comprising reduced nickel hydrate, the mixture within the reaction zone is heated to the reaction temperature in contact with gaseous hydrogen at superatmospheric pressure, 2,5-dimethylpiperazines are distilled from the effluent reaction mixture, and at least a portion of the residue from the distillation of the 2,5-dimethylpiperazines is recycled to the reaction zone.

References Cited in the file of this patent

Bain et al.: J. Am. Chem. Soc. 61, 532 (1939).
Martin et al.: J. Am. Chem. Soc. 70, 1817–18 (1948).
Pollard et al.: J. Am. Chem. Soc. 69, 854–855 (1948).